United States Patent [19]

Maley et al.

[11] 3,909,634

[45] Sept. 30, 1975

[54] THREE STATE LATCH

[75] Inventors: Gerald A. Maley, Fishkill; James L. Walsh, Hyde Park, both of N.Y.

[73] Assignee: International Business Machines Corporation, Armonk, N.Y.

[22] Filed: Feb. 5, 1971

[21] Appl. No.: 113,001

[52] U.S. Cl. ................ 307/289; 307/209; 307/215; 307/291; 328/205

[51] Int. Cl.² .......................................... H03K 3/29

[58] Field of Search ........... 307/209, 215, 291, 289; 328/205

[56] References Cited

UNITED STATES PATENTS 3,155,947 11/1964 Yoshida ............................ 307/215

3,156,830 11/1964 Walsh ............................ 307/317 X

*Primary Examiner*—John Zazworsky

*Attorney, Agent, or Firm*—Martin C. Rieffun; Thomas F. Galvin

[57] ABSTRACT

A ternary latch circuit has an input set line, an output line, and a reset line. The potential of the output line follows that of the input set line as the potential of the latter is raised from the 0 state through the 1 state to the 2 state. The output line potential is held at the highest level reached by the set line. When the reset line is raised, the potential of the output line falls to its original value.

4 Claims, 3 Drawing Figures

OR

| INPUTS A | INPUTS B | OUTPUT |
|---|---|---|
| 0 | 0 | 0 |
| 0 | 1 | 1 |
| 0 | 2 | 2 |
| 1 | 0 | 1 |
| 1 | 1 | 1 |
| 1 | 2 | 2 |
| 2 | 0 | 2 |
| 2 | 1 | 2 |
| 2 | 2 | 2 |

INTERCHANGER 1

| INPUT | OUTPUT |
|---|---|
| 0 | 2 |
| 1 | 1 |
| 2 | 0 |

INVENTORS
GERALD A. MALEY
JAMES L. WALSH
BY Martin G. Reiffin
ATTORNEY

THREE STATE LATCH

BACKGROUND OF THE INVENTION

1. Field of the Invention

The present invention relates to ternary algebra; that is, to an algebra wherein the variables may take on any one of three values, as distinguished from merely the two values of Boolean or binary alegbra. The invention also relates to latches of the type wherein the output line potential is raised in response to a signal on the set line and lowered in response to a signal on the reset line.

2. Description of the Prior Art

Latches of the above-described type are well known in the binary art. However, the present inventors know of no such latch in the prior art of the ternary system.

SUMMARY OF THE INVENTION

It is therefore, a primary object of the present invention to provide a latch utilizing ternary or three-state algebra and which operates in the following manner: As the set line is raised from 0 to 1, the output line potential should follow. When the set line is raised from 1 to 2, the output line again follows. The output line remains at 2 when the set line is lowered to 1 and then to 0. If the reset line is raised to 1, then the output line falls from 2 to 1. If the reset line is raised to 2, then the output line falls to 0.

DESCRIPTION OF THE PREFERRED EMBODIMENT

Figures 1, 2, 3:
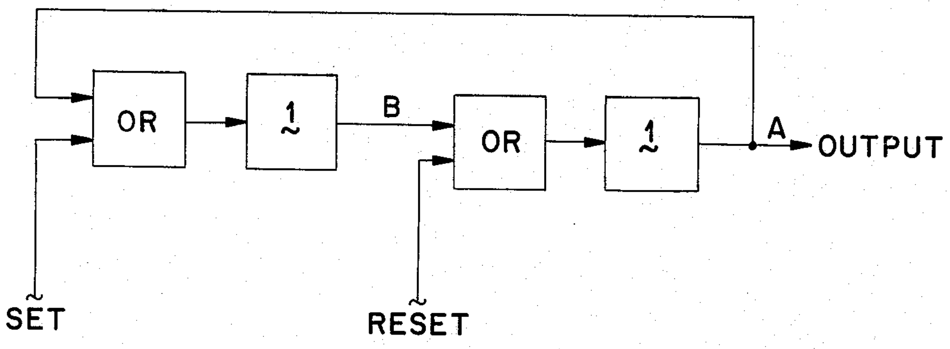
FIG. 1 is a schematic diagram showing a ternary latch in accordance with the present invention.
FIG. 2 is a truth table of the ternary OR function.
FIG. 3 is a truth table of the Interchanger 1 function.

Referring first to FIG. 1, the ternary latch in accordance with the present invention comprises a pair of ternary OR gates each designated by the symbol "OR" and a pair of ternary Interchanger 1 gates each designated by the symbol "1̰". Each of the ternary OR gates has two inputs and one output. Each of the ternary Interchanger 1 gates has one input and one output. The output of each ternary OR gate is connected to the input of a respective one of the ternary Interchanger 1 gates. The output of each ternary Interchanger 1 gate is connected to one of the inputs of a respective one of the ternary OR gates. The other input of one of the ternary OR gates is designated "SET" and constitutes means for transmitting a set signal to said input of the ternary OR gate. The other input of the other ternary OR gate is designated "RESET" and constitutes means for transmitting a reset signal to the other input of said other ternary OR gate.

The ternary OR gates may have the same circuitry as conventional binary OR gates well known in the prior art. The ternary Interchanger 1 gates may be constructed in accordance with the circuitry of either of the embodiments in our co-pending application Ser. No. 113,000, Filed Feb. 5, 1971 and entitled "Interchanger 1 Circuits", or may be constructed in accordance with the circuitry of U.S. Pat. No. 3,156,830.

The ternary latch shown in FIG. 1 will store one ternary digit. That is, it has three different stable conditions when both input lines are at the "0" level. These three distinct states can be identified by observing the logic levels on line A or line B. The relationship of line A to line B is shown in the following table; it is assumed that both input lines are at the 0 level.

| A | B |
|---|---|
| 0 | 2 |
| 1 | 1 |
| 2 | 0 |

The states of the latch are referred to by specifying the levels on line A.

The function of the two input lines is to move the latch back and forth between its three stable levels. This means that there are nine possible transitions that are of interest. That is, the latch can be assumed to be in any one of three stables and can then be driven to any one of three stables. This, of course, included the three cases where the latch is being driven to a state that it already holds. Two of these transitions are shown below.

EXAMPLE I

Starting point

Latch set to a 0
Line A at 0
Line B at "2"
Set and Reset lines at 0

Function

To drive the latch to state 2

Operation in steps

| | Set line | Reset line | Line B | Line A |
|---|---|---|---|---|
| Start | 0 | 0 | 2 | 0 |
| Raise set line | 2 | 0 | 0 | 0 |
| | 2 | 0 | 0 | 2 |
| Set line returned to "0" | 0 | 0 | 0 | 2 |

EXAMPLE II

Starting point

Latch set to a 2
Line A at 2
Line B at 0

Function

To drive the latch to 0

Operation in steps

| | Set line | Reset line | Line B | Line A |
|---|---|---|---|---|
| Start | 0 | 0 | 0 | 2 |
| Raise Reset line | 0 | 2 | 0 | 0 |
| | 0 | 2 | 2 | 0 |
| Return Reset line to "0" | 0 | 0 | 2 | 0 |

If one examines the nine possible transitions, the following generalization will hold. The set line is used to advance the stable state of the latch from 0 up through 2 while the reset line is used to lower the setting of the latch from 2 through 0.

It is to be understood that the specific embodiment disclosed herein is merely illustrative of one of the many forms which the invention may take in practice and that numerous modifications thereof will readily occur to one skilled in the art without departing from the scope of the invention as delineated in the appended claims, and that the claims are to be construed as broadly as permitted by the prior art.

We claim:

1. A ternary latch circuit comprising
first and second ternary OR gates each having two inputs and one output,
first and second ternary Interchanger 1 gates each having an input and an output,
each of said ternary Interchanger 1 gates operating to interchange their highest and lowest output levels,
means connecting the output of said first and second Interchanger 1 gates to an input of said second and first OR gates, respectively,
means connecting the output of said first and second OR gates to the input of said first and second Interchanger 1 gates, respectively,
means for transmitting a set signal to the other input of said first OR gate, and
means for transmitting a reset signal to the other input of said second OR gate.

2. A ternary latch circuit comprising
a pair of ternary OR gates each having two inputs and one output,
a pair of ternary Interchanger 1 gates each having an input and an output,
each of said ternary Interchanger 1 gates operating to interchange their highest and lowest output levels,
means connecting the output of one Interchanger 1 gate to an output of one of said OR gates,
means connecting the output of the other Interchanger 1 gate to an input of the other of said OR gates,
means connecting the output of said other OR gate to the onput of said one Interchanger 1 gate, and
means connecting the ouput of said one OR gate to the input of said other Interchanger 1 gate.

3. A ternary latch circuit as recited in claim 2 and comprising
means for transmitting a set signal to the other input of said one OR gate, and
means for transmitting a rest signal to the other input of said other OR gate.

4. A ternary latch circuit comprising
an input set line,
an output line,
a reset line,
means for causing the potential of the output line to follow that of the input set line as the potential of the latter is raised from the 0 state through the 1 state and to the 2 state,
means for holding the output line potential in a stable state at the highest level reached by the set line, and
means for causing the output line to fall in response to raising of the reset line.

* * * * *